US007232070B2

(12) United States Patent
Craig

(10) Patent No.: US 7,232,070 B2
(45) Date of Patent: Jun. 19, 2007

(54) CHEMICAL/BIOLOGICAL HAZARD TRIGGER WITH AUTOMATIC MAIL PIECE TAGGING SYSTEM AND METHOD

(75) Inventor: William C. Craig, Endwell, NY (US)

(73) Assignee: Lockheed Martin Corporation, Bethesda, MD (US)

(*) Notice: Subject to any disclaimer, the term of this patent is extended or adjusted under 35 U.S.C. 154(b) by 130 days.

(21) Appl. No.: 10/865,163

(22) Filed: Jun. 10, 2004

(65) Prior Publication Data

US 2005/0274788 A1 Dec. 15, 2005

(51) Int. Cl.
*G06K 7/10* (2006.01)

(52) U.S. Cl. .................................. 235/462.01; 235/383

(58) Field of Classification Search ........... 235/462.01, 235/437, 376, 385, 462.25, 382, 383; 209/509, 209/536

See application file for complete search history.

(56) References Cited

U.S. PATENT DOCUMENTS

| | | | | |
|---|---|---|---|---|
| 2,758,712 A | | 8/1956 | Linderman | 209/111 |
| 3,021,006 A | | 2/1962 | Beckman, Jr. | 209/111.5 |
| 3,027,830 A | | 4/1962 | Yaeger | 101/2 |
| 4,165,277 A | | 8/1979 | Frewin | 209/3.3 |
| 4,675,498 A | | 6/1987 | Lemelson | 219/121 |
| 4,780,835 A | * | 10/1988 | Sievel et al. | 705/408 |
| 5,249,687 A | | 10/1993 | Rosenbaum et al. | 209/3.3 |
| 5,352,611 A | | 10/1994 | Fine et al. | 436/43 |
| 5,472,882 A | | 12/1995 | Rounbehler et al. | 436/111 |
| 5,637,811 A | | 6/1997 | Simard et al. | 73/865.8 |
| 5,772,040 A | | 6/1998 | Tomiyama et al. | 209/3.3 |
| 6,003,677 A | | 12/1999 | Foley | 209/2 |
| 6,039,257 A | | 3/2000 | Berson et al. | 235/468 |
| 6,209,920 B1 | * | 4/2001 | Fabel | 283/62 |
| 6,239,397 B1 | | 5/2001 | Rosenbaum et al. | 209/584 |
| 6,905,661 B2 | * | 6/2005 | Ryan et al. | 422/300 |
| 2003/0145664 A1 | * | 8/2003 | Schwarz et al. | 73/863.22 |

* cited by examiner

*Primary Examiner*—Daniel Stcyr
(74) *Attorney, Agent, or Firm*—Burns & Levinson LLP; Jacob N. Erlich; Harvey Kaye

(57) ABSTRACT

Apparatus and method for detecting and identifying hazardous material in a mail stream in which hazardous particulates or material in or on mail pieces in a mail stream are detected and the mail piece bearing the hazardous material is identified. A bar code applicator applies a unique bar code to the wrapper of each mail piece identified as potentially containing hazardous material. The bar code applicator is an ink jet which applies the bar code on-the-fly. The bar code applied is encoded with specific information about the detection parameters at the time of the event in addition to specific information about the date, time of day, machine identification, temperature and humidity conditions, etc. present at the time of the event.

11 Claims, 2 Drawing Sheets

CHEMICAL/BIOLOGICAL HAZARD TRIGGER WITH AUTOMATIC MAIL PIECE TAGGING SYSTEM AND METHOD

CROSS-REFERENCE TO RELATED APPLICATIONS

The present application is related to an application entitled Postal Image Augmented Bio-warfare Aerosolized Agent Trigger filed on the same date as the present application, and having one common inventor, and the content thereof is hereby incorporated herein by reference.

BACKGROUND OF THE INVENTION

The present invention relates to a system and method for detecting hazardous materials on or inside articles and, more particularly, to a system and method for detecting hazardous materials inside mail and marking them.

All economies depend upon the physical shipment of materials for their functioning including the shipment of mail, merchandise, raw materials, and other goods.

In some circumstances, it is desirable to subject the goods to some type of inspection to determine the presence of hazardous or impermissible materials, including biological and chemical materials. In general, sophisticated sensing systems are known for the detection of hazardous biological and chemical materials. For example, such systems can include conventional laboratory facilities as well as mobile or semi-mobile units that can automatically or semi-automatically detect the presence of the undesired substance or substances. Others include sensor or detectors for hazardous chemicals, explosives, illicit drugs, radioactive particles, and other hazardous materials. These sensors can be used single, or in combinations, to detect as many types of hazardous particles or vapors as required.

U.S. Pat. No. 2,758,712 for detecting apparatus discloses an arrangement for the detection of pin holes in tin plate.

U.S. Pat. No. 3,021,006 for sorting and identifying sources of work-pieces discloses an arrangement for sorting articles using marker apparatus.

U.S. Pat. No. 3,027,830 for recognition apparatus discloses an arrangement for recognizing mail bearing luminescent markings.

U.S. Pat. No. 4,165,277 for article monitoring and reject apparatus discloses which scans articles for defects.

U.S. Pat. No. 4,675,498 for apparatus and method for coding objects discloses an arrangement for coding envelopes.

U.S. Pat. No. 5,249,687 for barcode translation for deferred optical character recognition mail processing discloses an arrangement for reading standard bar codes as well as other bar codes without the need for using a particular sequence.

U.S. Pat. No. 5,352,611 for sampling and determining the presence of compounds in containers discloses use of compressed air to displace at least a portion of any contents.

U.S. Pat. No. 5,472,882 for sampling and determining the presence of salts in containers discloses the detecting of contaminants in bottles using chemiluminescence detection techniques.

U.S. Pat. No. 5,637,811 for detecting the presence of a hard object in an item of mail discloses an arrangement for detecting a hard object is present inside an envelope.

U.S. Pat. No. 5,772,040 for work-piece conveying apparatus used with work-piece inspection device discloses the detection of defective wire bonding of work-pieces.

U.S. Pat. No. 6,003,677 for automated processing of ATM envelopes discloses printing of information on an envelope to provide an audit trail for subsequent processing.

U.S. Pat. No. 6,039,257 for postage metering system that utilizes secure invisible bar codes for postal verification discloses using an invisible secure message in bar code form over the usual postage meter print out.

U.S. Pat. No. 6,239,397 discloses an arrangement for sorting mailings in which identification information is printed on non-processable mailings.

U.S. Published Application No. US 2002/0126008 published Sep. 12, 2002 and filed Oct. 31, 2001 discloses use of sensors at various locations within a typical mail processing system to sense the presence of a harmful agent.

U.S. Published Application No. US 2002/0124664 shows a mail processing system which includes the screening of mail for contamination by biological or chemical agents.

SUMMARY OF THE INVENTION

The present invention is arranged to work in conjunction with a chemical or biological hazard detection trigger attached to postal mail handling equipment. The invention marks suspect mail pieces with a unique barcode if a trigger event is detected. The bar code marking can be done with visible ink or with ink only visible under ultraviolet light. The bar code marking is used to rapidly identify suspect mail pieces, and correlate location, time of day and trigger operational response parameters to specific mail pieces being moved through the equipment at the time of the event.

Work has been done with various aerosol particle detection equipment in an effort to develop a system for detecting aerosolized pathogens that may be emitted from mail pieces during processing. The present invention is for a method of uniquely marking the mail pieces being processed at the time of the trigger event. The unique marking can be applied with ink visible to the naked eye under normal lighting conditions, or with ink normally invisible that becomes visible only under a UV light source. The ink can be applied with a high-speed ink jet printer while the mail piece is in motion. The special bar code marking will contain information about when and where the mail piece was processed at the time of the trigger event, as well as parametric data relative to the trigger event itself. The barcode marking can then be used to rapidly locate the suspect mail pieces by manual means, or for automatically directing the mail pieces to a specific location or sorting bin. Barcodes currently applied to mail pieces by the USPS for sorting purposes are done at a point down stream from the trigger detection point, also these bar codes are not suitable for encoding trigger parametric data that is helpful for forensic purposes. This invention can work with any type of real time or near real time trigger mechanism—ultraviolet laser induced fluorescence (UV-LIF), mass-spectrometry, laser induced breakdown spectrometry, ion mobility and the like.

Presently there is apparently no automatic means of uniquely marking suspect mail pieces.

A mail piece that causes a trigger event is typically being transported at high speed by a postal processing machine. Locating the exact mail pieces that may be responsible for the event can be a difficult and time-consuming manual process. The present invention provides a simple means of locating the suspect mail pieces, and directly links specific trigger parametric data to the suspect mail pieces, preserving the chain of evidence and associated forensic data.

The present invention combines real time trigger technology with high-speed inkjet printing. The bar code provides a means to rapidly identify mail pieces being processed at the time of the trigger event and correlating the mail piece to trigger parameters preserving the chain of evidence. The bar code can be used to uniquely divert mail pieces that are identified as potentially hot either immediately or after off-line second tier analysis.

Currently there is no direct means of identifying mail pieces being processed at the time of a trigger event. Off-line analysis of tag—ids (serial numbers) printed on the letters is currently required, which is time consuming and impractical.

Other features and advantages will be apparent from the following detailed description of preferred embodiments taken in conjunction with the accompanying drawings.

DESCRIPTION OF THE PREFERRED EMBODIMENTS OF THE INVENTION

The present invention is arranged to work in conjunction with a chemical or biological hazard detection trigger attached to postal mail handling equipment. Such equipment is known in the prior art. In accordance with the present invention suspect mail pieces are marked, on-the-fly, with a unique barcode when a triggering event is detected. The bar code marking can be done with visible ink or with ink only visible under ultraviolet light. The bar code marking is used to rapidly identify suspect mail pieces, and correlate location, time of day and trigger operational response parameters to specific mail pieces being moved through the equipment at the time of the event.

Various aerosol particle detection trigger equipment is available that can be used to develop a system for detecting aerosolized pathogens that may be emitted from mail pieces during processing. For example, as mail is fed into an automatic mail processing machine, it is normally trapped between a pair of pinch belts for transport through the mail sorting and processing equipment. As the mail piece is trapped between the belts, air and particulate matter within a mail envelope is expelled, which can then be detected by the appropriate triggering equipment.

Figure 1:
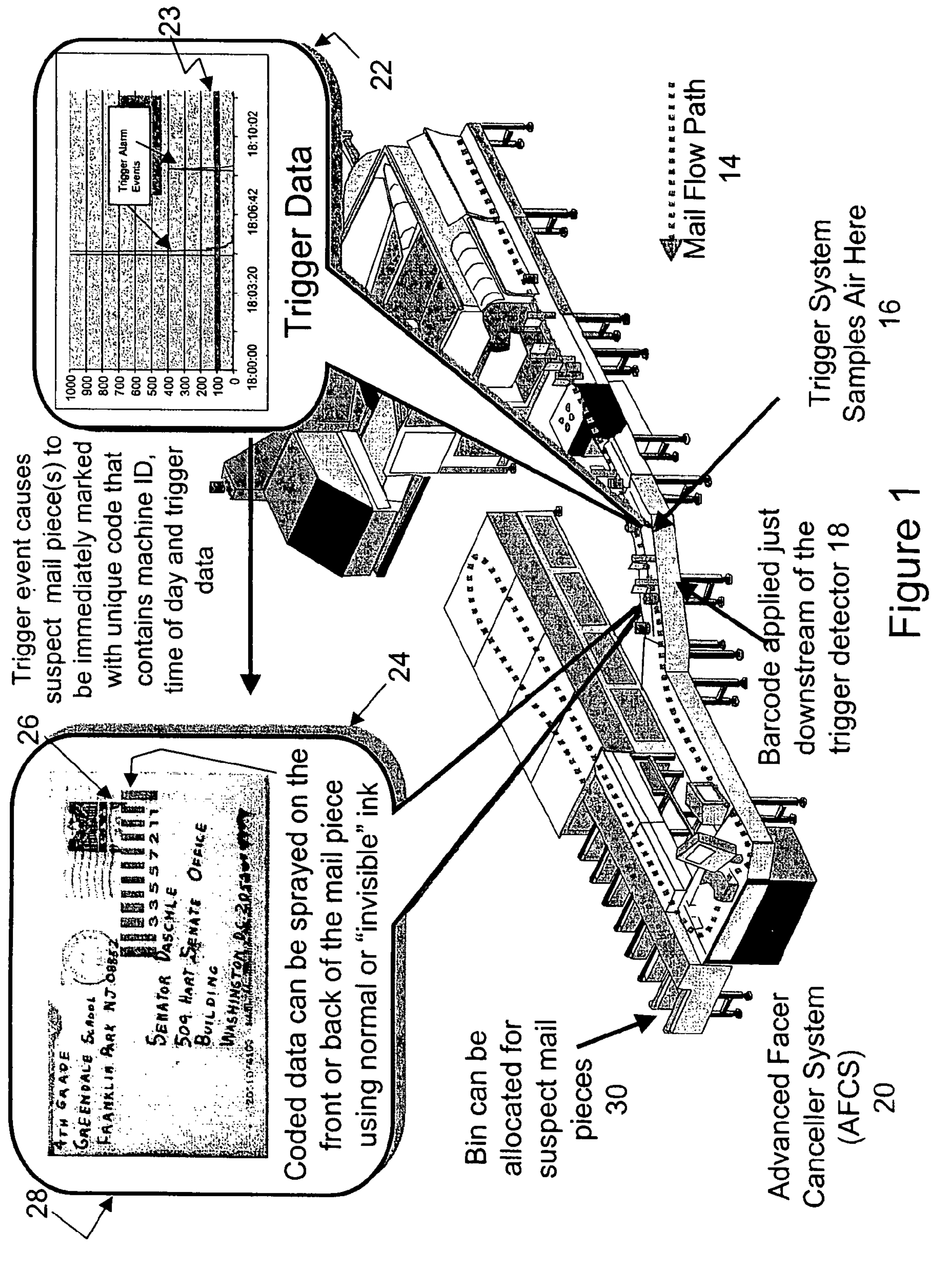
FIG. 1 is a schematic diagram of the components of the system of the present invention.

The present invention provides an apparatus and a method of uniquely marking the mail pieces being processed at the time of the trigger event. The unique marking can be applied with ink visible to the naked eye under normal lighting conditions, or with ink normally invisible that becomes visible only under a UV light source. The ink can be applied with a high-speed ink jet printer while the mail piece is in motion. FIG. 1 shows the system implemented on an Advanced Facer Canceller System (AFCS), which is used by the US Postal Service.

A special bar code marking is used which contains information about when and where the mail piece was processed at the time of the trigger event, as well as parametric data relative to the trigger event itself. In one embodiment, the parametric data contains the number of potentially hazardous particles detected over a defined time interval. For example, in an aerosol trigger system using UV-LIF technology, one or more UV lasers are trained on a stream of particles moving through a view volume. Referring to FIG. 1, the air is sampled at location 16. The number of particles detected over a one second interval that meet certain fluorescence and backscatter (size) criteria is measured and plotted on a time-magnitude diagram 22. When the counts per second cross a defined threshold, 23, a potential biohazard event is declared. The peak value and time of the event can then be encoded in a special barcode, 26 on the suspect mail piece or mail pieces. This barcode marking can then be used to rapidly locate the suspect mail pieces by manual means, or for automatically directing the mail pieces to a specific location or sorting bin, 30. Barcodes are currently applied to mail pieces by the USPS for sorting purposes. This is done at a point down stream from the trigger detection point. Also, these bar codes are not suitable for encoding trigger parametric data that is helpful for forensic purposes. This invention can work with any type of real time or near real time trigger mechanism—ultraviolet laser induced fluorescence (UV-LIF), mass-spectrometry, laser induced breakdown spectrometry, ion mobility and the like.

The present invention combines real time trigger technology with high-speed inkjet printing. The bar code provides a means to rapidly identify mail pieces being processed at the time of the trigger event and correlating the mail piece to trigger parameters preserving the chain of evidence. The bar code can be used to uniquely divert mail pieces that are identified as potentially hot either immediately or after off-line second tier analysis.

FIG. 1 shows a schematic view of a mail sorting/handling line into which the present invention has been incorporated. The mail is unloaded onto the feed section 12 of the conveyor system and travels in the direction of arrow 14. At a chosen trigger location 16, various predetermined trigger data are collected by various sensors, depending upon the particular data chosen for causing a triggering of the system.

In one embodiment of the invention, using UV-LIF technology, the trigger data are collected relative to the number of particles detected over a defined time interval, one second, for example, that meet certain criteria corresponding to a "region of threat" or ROT. These criteria are typically related to the size and fluorescence characteristics of the particle. Weapons grade biohazard particulates are targeted for the respirable size range, which is of 1–10 microns in diameter. Certain fluorescence characteristics are indicative of biological activity.

Immediately downstream of the trigger location 16 is a marking station 18 at which a barcode is applied, such as for example being sprayed on the front or back of the mail piece using normal ink or invisible ink.

An example of a high speed barcode printer is the Videojet Series 2100 which can print text and barcodes at speeds of up to 6 meters per second. At this speed the printer can print up to 4,230 bars per second or 1,388 characters per second. Using 2-D barcode technology, a relatively small barcode containing a significant amount of information can be used. The information encoded may include the peak and surrounding points of a time-magnitude graph, 22 in FIG. 1, as well as the time of day and the ID of the AFCS machine.

Box 22 shows a representation of the trigger data on a time-magnitude graph, and box 24 shows the bar code 26 that is sprayed on the front or back of the mail piece 28, in this example using visible ink, At the end of the conveyor line the mail may be sorted into a bin 30 reserved for suspect mail pieces which may then be further examined either at the immediate location or be removed to an isolated location in a room with a protected air circulation system or the like to prevent spreading of the hazardous material.

Figure 2:
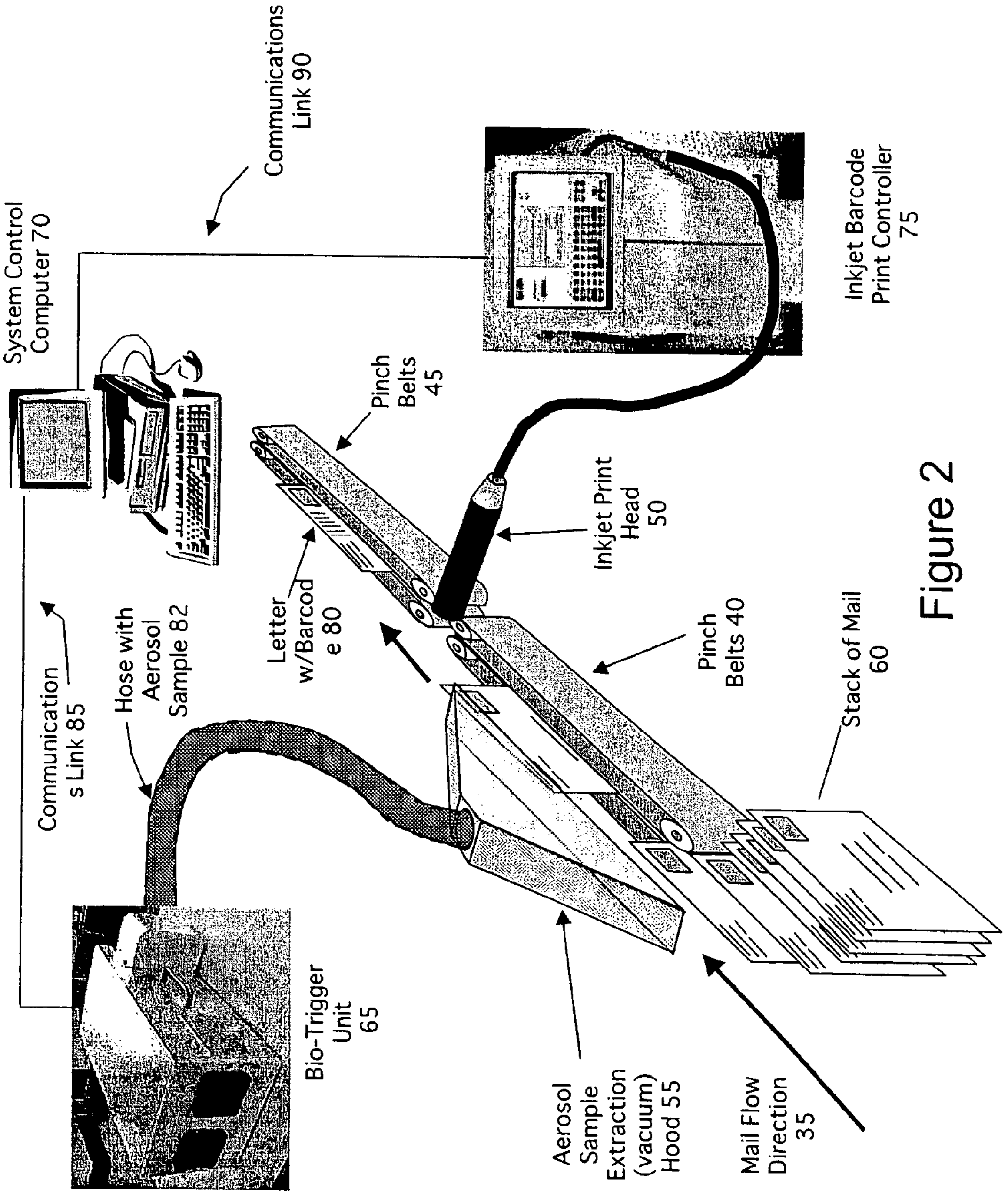
FIG. 2 is a schematic diagram providing a more detailed view of certain operational elements of the system.

A more detailed view of the important operational elements of the invention is shown in FIG. 2. In this embodiment, mail flows in direction 35 and air sampling is done using an aerosol extraction vacuum hood 55 corresponding to location 16 in FIG. 1. The inkjet barcode print head 50 is shown downstream of the air sampling location. The inkjet print head corresponds to location 18 in FIG. 1.

Mail is captured between pinch belts 40 forcing air and particulate matter out of the envelope. The particles are extracted by the hood 55 and transported to the trigger device 65 through connection hose 82. The trigger device processes the particulate in the air sample to determine if size and fluorescence characteristics indicate a hazardous substance.

If a potential hazard is detected, the trigger unit notifies the control system 70 and passes parametric data relative to the event over communications link 85. The control system then passes the necessary notification and data over communications link 90 to inkjet barcode print controller 75. The print controller 75 commands the print head 50 to spray the required bar code on the envelope 80.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

The invention claimed is:

1. Apparatus for detecting and identifying hazardous particulates in a mail stream, comprising:

A. means for detecting hazardous particulates in or on mail pieces in a mail stream and for identifying the mail piece or pieces bearing the hazardous particulates;

B. a bar code applicator for applying a unique bar code to the wrapper of each mail piece identified as containing hazardous particulates;

C. said unique bar code being encoded with specific information about the detection data collected at the time of the detection event, includes a parameter which is indicative of the amount of particles detected over a predetermined time period exceeding a pre-defined hazard based threshold parameter, and provides at least one type of specific information about the date, time of day, machine identification, temperature and humidity conditions.

2. Apparatus as defined in claim 1 wherein the bar code applicator is an ink jet which applies the bar code on-the-fly.

3. Apparatus as defined in claim 1 wherein a diverter diverts each mail piece marked with a unique code to separate such mail piece from other mail pieces which do not have such a unique code.

4. Apparatus as defined in claim 1 wherein the unique bar code also provides the names of the workers who were working on the particular line at the time the mail was marked with the unique code.

5. Apparatus as defined in claim 1 wherein the means for detecting detects the amount of particles detected over a predetermined time period exceeding a pre-defined hazard based threshold parameter, and provides specific information about the date, time of day, machine identification, temperature and humidity conditions.

6. Apparatus as defined in claim 1 further comprising an aerosol extraction vacuum hood for air sampling; a pinch assembly for forcing air and particulate matter out of the mail which is extracted by the hood; and means for transporting the particulate matter to a trigger device for processing the particulate in the air sample to determine if the size and fluorscence characteristics indicate a hazardous substance; a communications link; a control system which is notified by the trigger device through the communications link when there is an indication of a hazardous substance present and the parametric data relative to the event is passed through the communications link to the control system which passes the necessary notification and data over the communications link to the barcode applicator which applies the required bar code onto the mail.

7. Apparatus as defined in claim 6 wherein the bar code provides information about when and where the mail was processed at the time of the trigger event.

8. Apparatus as defined in claim 7 further comprising a diverting device for diverting the mail marked as being hazardous.

9. A mail article containing a unique code indicating that the article bears hazardous particulates, and encoding in the unique code specific information about the detection data collected at the time of the detection event, the unique code further containing information about the detection data at the time of the detection including specific information about the date, time of day, machine identification, temperature and humidity conditions.

10. A mail article as defined in claim 9 wherein the unique code further contains information about the amount of particles detected over a predetermined time interval meeting pre-defined hazard based threshold parameters.

11. A mail article as defined in claim 10 wherein the unique code further contains information about the names of the workers who were working on the particular line at the time the mail was marked with the unique code.

* * * * *

UNITED STATES PATENT AND TRADEMARK OFFICE

CERTIFICATE OF CORRECTION

PATENT NO. : 7,232,070 B2
APPLICATION NO. : 10/865163
DATED : June 19, 2007
INVENTOR(S) : William C. Craig It is certified that error appears in the above-identified patent and that said Letters Patent is hereby corrected as shown below:

Column 6
In claim 6, at line 18, replace the word "fluorscence" with --fluorescence--.

Signed and Sealed this

Seventh Day of August, 2007

JON W. DUDAS
*Director of the United States Patent and Trademark Office*